United States Patent
Wesselkamper et al.

(10) Patent No.: US 11,379,580 B1
(45) Date of Patent: Jul. 5, 2022

(54) MIXED STORAGE OF DATA FIELDS

(71) Applicant: Xilinx, Inc., San Jose, CA (US)

(72) Inventors: James D. Wesselkamper, Albuquerque, NM (US); Edward S. Peterson, Queen Creek, AZ (US); Jason J. Moore, Albuquerque, NM (US); Steven E. McNeil, Rio Rancho, NM (US); Roger D. Flateau, Jr., San Jose, NM (US); Danny Tsung-Heng Wu, San Jose, CA (US); Boon Y. Ang, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 309 days.

(21) Appl. No.: 16/819,864

(22) Filed: Mar. 16, 2020

(51) Int. Cl.
*G06F 21/55* (2013.01)
*G06F 21/72* (2013.01)
*H04L 9/32* (2006.01)
*G11C 29/00* (2006.01)
*G11C 29/08* (2006.01)

(52) U.S. Cl.
CPC .......... *G06F 21/554* (2013.01); *G06F 21/72* (2013.01); *G11C 29/787* (2013.01); *G11C 29/789* (2013.01); *H04L 9/3236* (2013.01); *G06F 2221/034* (2013.01); *G11C 29/08* (2013.01)

(58) Field of Classification Search
CPC .. G06F 21/554; G06F 21/72; G06F 2221/034; G11C 29/787; G11C 29/789; G11C 29/08; H04L 9/3236
See application file for complete search history.

(56) References Cited

U.S. PATENT DOCUMENTS

| | | | | |
|---|---|---|---|---|
| 6,944,083 B2* | 9/2005 | Pedlow, Jr. | ............ | G11C 17/18 |
| | | | | 365/96 |
| 8,370,691 B1* | 2/2013 | Cheng | .............. | G01R 31/31816 |
| | | | | 714/736 |

(Continued)

FOREIGN PATENT DOCUMENTS

WO     WO 03/069841 A1 *    2/2003          H04L 9/06333

OTHER PUBLICATIONS

Timmers et al., "Hardening Secure Boot on Embedded Devices for Hostile Environments." Riscure. Available: https://www.riscure.com/uploads/2019/06/Riscure_Hardening_Secure_Boot_Hostile_Environments.pdf. [Accessed Jun. 2019].

(Continued)

*Primary Examiner* — Christopher A Revak
(74) *Attorney, Agent, or Firm* — Crawford Maunu PLLC (57) ABSTRACT

An array of non-volatile memory cells includes rows and columns. A volatile storage circuit provides addressable units of storage. A control circuit reads first type data and second type data from one or more of the rows and multiple ones of the columns of the array of non-volatile memory cells. The control circuit stores the first type data and second type data read from each row in one or more addressable units of storage of the volatile storage. A security circuit reads first data from the one or more of the addressable units of the volatile storage and selects from the first data, the second type data that includes one or more bits of each of the one or more of the addressable units. The security circuit performs an integrity check on the selected second type data, and generates an alert signal that indicates a security violation in response to failure of the integrity check.

20 Claims, 5 Drawing Sheets

(56) References Cited

U.S. PATENT DOCUMENTS

| | | | | |
|---|---|---|---|---|
| 2007/0174622 A1* | 7/2007 | Romain | ................. | G06F 21/79 |
| | | | | 713/176 |
| 2008/0152144 A1* | 6/2008 | Douguet | ............... | H04L 9/3236 |
| | | | | 380/277 |
| 2018/0095897 A1* | 4/2018 | Upasani | ................. | G11C 17/18 |
| 2019/0065751 A1* | 2/2019 | Srinivas | ................ | G06F 21/566 |
| 2020/0242248 A1* | 7/2020 | Leger | ...................... | G06F 21/75 |
| 2021/0256119 A1* | 8/2021 | Kirschner | ............... | G06F 21/75 |

OTHER PUBLICATIONS

Xilinx, Inc. U.S. Appl. No. 16/806,475, filed Mar. 2, 2020. No attachment.
Xilinx, Inc. U.S. Appl. No. 16/806,546, filed Mar. 2, 2020. No attachment.

* cited by examiner

MIXED STORAGE OF DATA FIELDS

TECHNICAL FIELD

The disclosure generally relates to protecting against attacks on an electronic system.

BACKGROUND

Electronic systems often employ one-time programmable (OTP) circuits to establish static configuration data for customizing certain attributes of the system. One such customization can control security features of the system. For example, OTP circuits can be used to enable security functions for booting the electronic system and provide keys used for encryption and/or decryption.

Researchers have found that the signals sensed from OTP circuits can be intentionally disturbed by way of electromagnetic fault injection (EMFI). Unauthorized parties may seek to bypass system security through an EMFI attack on the OTP circuits.

SUMMARY

A disclosed circuit arrangement includes an array of non-volatile memory cells arranged in a plurality of rows and a plurality of columns and a volatile storage circuit configured to provide addressable units of storage. A control circuit is coupled to the array of non-volatile memory cells and to the volatile storage circuit. The control circuit is configured to read first type data and second type data from one or more rows of the plurality of rows and the plurality of columns of the array of non-volatile memory cells. The control circuit is configured to store the first type data and second type read from each row in one or more addressable units of storage of the volatile storage circuit. A security circuit is coupled to the volatile storage circuit. The security circuit is configured to read first data from the one or more of the addressable units of the volatile storage circuit. The security circuit is configured to select from the first data, the second type data that includes one or more bits of each of the one or more of the addressable units. The security circuit is configured to perform an integrity check on the second type data selected from the first data. The security circuit is configured to generate an alert signal that indicates a security violation in response to failure of the integrity check.

A disclosed method includes reading first type data and second type data from one or more rows of a plurality of rows and a plurality of columns of an array of non-volatile memory cells by a control circuit. The method includes storing the first type data and second type read from each row in one or more addressable units of storage of a volatile storage circuit that is configured to provide addressable units of storage. The method includes a security circuit reading first data from the one or more of the addressable units of the volatile storage circuit and selecting from the first data, the second type data that includes one or more bits of each of the one or more of the addressable units. The method includes the security circuit performing an integrity check on the second type data selected from the first data. The method includes the security circuit generating an alert signal that indicates a security violation in response to failure of the integrity check.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Some electronic systems have efuses as OTP circuits for controlling security features, such as authentication and decryption of data used to configure the system for secure booting. The data represented by the efuses can enable a security mode and/or encode one or more cipher keys. The efuses can be arranged as one or more banks of multiple efuses, with each bank providing a multi-bit word of data, and the banks of efuses implemented on an integrated circuit die as a monolithic group of circuit elements. An efuse controller circuit can be coupled to the banks of efuses for one-time programming of the efuses and reading data from the programmed efuses.

Prior to processing data programmed in efuses, some systems will store the data read from the efuses in data storage circuits such as a set of registers or a RAM. The efuse data may be read and stored in storage circuits because the data may need to be accessed multiple times and the efuses may be reliable for a limited number of reads. In one application the system will read data from the efuses once per power cycle, and subsequent accesses to that data is made to the data storage circuits.

An EMFI attack on the system focuses on particular areas of an IC die or package and can corrupt the data as it is read from the efuses. The EMFI attack can result in all logic-0 values or all logic-1 values instead of the logic values actually programmed into the efuses. An objective of an EMFI attack may be to bypass configured security measures and permit loading of unauthorized configuration data or program code.

The disclosed circuits and methods protect against EMFI attacks on OTP circuits, such as efuses. The disclosed circuits and methods are not limited to protecting OTP circuits and can protect against EMFI attacks on non-volatile storage circuits in general, such as anti-fuses and re-programmable non-volatile storage circuits. The term "efuse cell" may be used instead of the shortened "efuse" to permit reference to the elements that are typically considered to be part of the efuse. For example, an efuse cell includes, among other circuit elements, a sense amplifier and an efuse circuit that can be "blown" in programming the efuse cell.

Banks of efuses are often arranged in rows and columns. For example, 4 kilobytes of efuses can be arranged as 128 rows by 32 columns, and the data stored in the efuses can be treated as 128 32-bit words. A caching operation can read each 32-bit value and store that 32-bit value into a cache register or 32-bit word addressable RAM.

Configuration data stored in an efuse array is often organized as "fields" of data, with each field serving a different purpose and different fields sometimes having different lengths. Each field is generally stored horizontally in a row or multiple rows of efuses. For example, a 256-bit serial number could occupy the first 8 rows, with bits 0-31 of the serial number occupying the first row, bits 32-63 occupying the second row, etc.

During a read from a row of efuses and storage of the word in cache storage (registers or RAM), an EMFI attack can be performed at a particular time and corrupt the data. Multiple rows of data can be corrupted as a result of multiple EM pulses. In the example involving a serial number in the first 8 rows of efuses, 8 EM pulses could corrupt the first 8 words and change the serial number to a value that signifies a completely un-programmed state.

In some applications, the fields programmed in efuses are intended to specify static fields or dynamic fields. A static field has a value that does not change once the value has been programmed into the efuses. Examples of static fields include serial numbers, trim bits, and cryptographic keys. A dynamic field has a value that can change over the life cycle of the device. Examples of dynamic fields are key revocation fields, logging fields, and fields that accumulate tamper penalties.

An integrity check of static fields is feasible, because data ("protection bits" or "protection values") needed for the integrity check can be programmed into additional efuses at the time the static fields are programmed. The integrity check can determine and signal whether the field programmed in the efuses is valid or invalid based on a cyclic redundancy check (CRC) or a cryptographic hash, for example.

Dynamic fields cannot be directly protected by integrity checks, because the values can change, which makes programming of protection bits in efuses unviable.

The disclosed methods and circuits provide protection against EMFI attacks on dynamic and static fields stored on non-volatile storage and read into volatile memory. The disclosed approaches mix portions of dynamic fields with portions of static fields in units of non-volatile storage that are read and stored in addressable units of the volatile memory. For example, a row of efuses can store a portion or all of a dynamic field and a portion or all of a static field. Because an EMFI attack would affect the values of all the bits read from a row of non-volatile storage, an integrity check on the bits of the static field would implicitly indicate the validity of the bits of the dynamic field.

The bits of dynamic fields and static fields can be mixed in rows of the non-volatile storage in any regular or irregular pattern that is suitable for the particular application. An example of a regular pattern in which bits of dynamic fields and static fields are mixed in rows of the non-volatile storage, the bits of each dynamic field can be striped in a column, and bits of the static fields can be stored across rows. For example, in an efuse array having 128 rows and 32 columns, a dynamic field having 32 bits could be stored in column 0, rows 0-31, and the bits of a static field (or a portion thereof) could be stored in columns 1-31 of row 1.

Another example of a regular pattern involves storing the bits of dynamic fields diagonally in the rows and columns of the non-volatile storage, and storing bits of the static fields across the rows. For example, in an efuse array having 128 rows and 32 columns, a dynamic field having 32 bits could be stored in column 0/row 0, column 1/row 1, column 2/row 2, . . . , column 31/row 31, and the bits of a static field (or a portion thereof) could be stored in columns 1-31 of row 0, column 0/row 1, columns 2-31/row 1, columns 0-1/row 2, columns 3-31/row 2, columns 0-2/row 3, columns 4-31/row 3, etc.

An irregular pattern can be any arrangement in which bits of a dynamic field are stored in multiple rows of the non-volatile storage with no particular sequence of column positions of the bits.

By spreading the bits of a dynamic field across multiple rows of non-volatile storage, an attacker would be required to apply multiple EMFI pulses at the correct times to successfully corrupt all the bits of the dynamic field. In prior approaches in which all the bits of a dynamic field were stored in a single row, a single EMFI pulse could corrupt the bits.

In the disclosed circuits and methods, an array of non-volatile memory cells is arranged in multiple rows and columns, and a volatile storage circuit has addressable units of storage for storing data read from the non-volatile memory cells. A control circuit is configured to read data from one or more rows and multiple columns of the array of non-volatile memory cells and store first type data and second type data read from each row in an addressable unit of storage of the volatile storage circuit. A security circuit evaluates the data in the volatile storage circuit to detect an attack on the system. The security circuit is configured to read data from one or more of the addressable units of the volatile storage circuit. The security circuit selects the second type data from the data of the one or more rows. The second type data includes one or more bits from each of the one or more of the addressable units. The first type data can include bits of a dynamic field, and the second type data can include bits of a static field. The security circuit performs an integrity check on the selected bits of the second type data and generates an alert signal that indicates a security violation in response to failure of the integrity check. Because an EMFI attack would affect the values of all the bits read from a row of non-volatile storage and stored in the volatile storage circuit, an integrity check on the bits of the second type data (static field) would implicitly indicate the validity of the bits of the first type data (dynamic field).

Figure 1:
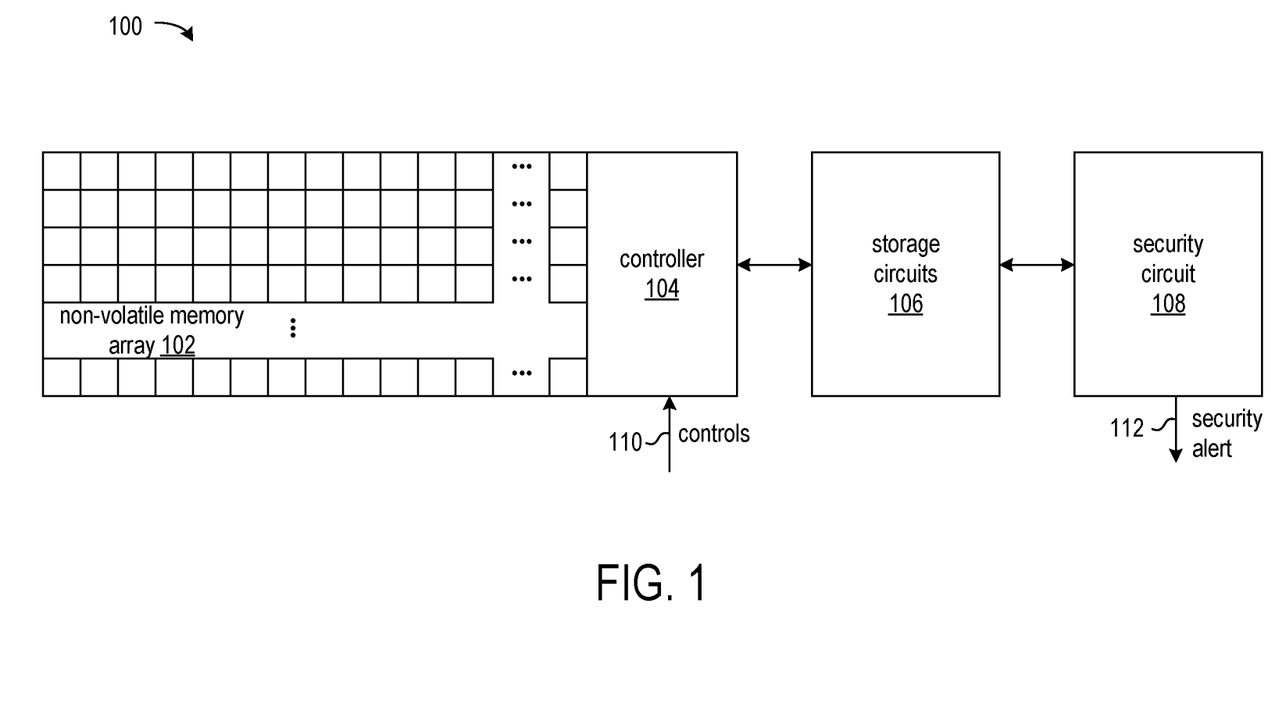
FIG. 1 shows a circuit arrangement that can detect attacks on data stored in non-volatile storage of an electronic system.

FIG. 1 shows a circuit arrangement 100 that can detect attacks on data stored in non-volatile storage of an electronic system. The circuit arrangement can detect EMFI attacks by mixing bits of dynamic fields with bits of static fields in rows of the non-volatile memory array 102. The circuit arrangement includes an array 102 of non-volatile memory cells, a controller circuit 104, storage circuits 106, and security circuit 108.

The non-volatile memory cells of the array 102 can be arranged on an integrated circuit (IC) die as rows and columns. The number of non-volatile memory cells in a row can be equal to the size of a word in storage circuits 106, for example. The non-volatile memory cells can be programmed to store data of static fields and dynamic fields. In some implementations, each non-volatile memory cell can be one-time programmable (OTP), such as an efuse cell. Each efuse cell includes an efuse circuit and a sense amplifier. The efuse circuit of an efuse cell can be blown (programmed) to change the state of the signal output by the sense amplifier to a state having an opposite logic value from the state of the signal output by the sense amplifier when the efuse cell is in the default state. In other implementations, the non-volatile memory array can be flash memory, EPROM, EEPROM, mask ROM, FRAM, MRAM, or FeFET memory, etc.

The controller circuit 104 can program the non-volatile memory cells 102 and can read sensed signals from the non-volatile memory cells. In response to input control signals 110, such as from a state machine or processor, the controller circuit can select rows of non-volatile memory cells and store data in the storage circuits 106 according to the states of the sensed signals from the selected non-volatile memory cells.

The controller circuit 104 reads data from one row of the non-volatile memory array at a time, which exposes the data to an EMFI attack on the data in that row. The controller circuit stores data read from each row of the non-volatile memory cells in in an addressable unit of storage of the volatile storage circuit, such as a word. The size of an addressable unit can vary according to applications requirements. Control signals 110 can also prompt the controller circuit to program selected ones of the non-volatile memory cells.

Data read from or to be programmed into the non-volatile memory cells 102 can be stored in the storage circuits 106. The storage circuits can be groups of registers or a RAM, in which case the storage circuits can be accessed by a memory bus. The storage circuits can be used to effectively cache data configured in the non-volatile memory cells in implementations involving efuse cells, as the efuse circuits may be reliable for only a limited number of reads. Configuration logic (not shown) can access the storage circuits for performing secure booting of the system, for example.

The security circuit 108 detects whether or not data read from the non-volatile memory cells 102 into the volatile storage circuits 106 has been compromised, such as from an EMFI attack. According to the disclosed approaches, the security circuit reads data from one or more of the addressable units (e.g., words). Each addressable unit includes bits of both a dynamic field(s) and a static field(s). The security circuit separates the bits of the static field(s) from the bit(s) of the dynamic field(s) by selecting a subset of bits from the data read from the volatile storage circuits. The selection of bits of static fields by the security circuit can either be managed by hardware or software.

The security check performs an integrity check on the subset of bits that has bits of the static field(s). The integrity check on the bits of the static field(s) is performed independent of the bit(s) of dynamic field(s). That is, the function performed by the security circuit to determine whether or not the bits of the static field(s) are valid does not input the state(s) of the bit(s) of the dynamic field(s).

Because bits of a static field(s) are mixed with one or more bits of a dynamic field(s) in a row of the non-volatile memory array 102, an EMFI pulse applied when the row of data is read would affect both the bits of the static field(s) and the bit(s) of a dynamic field(s). The corruption of the bits of the static field(s) would be detected, which would also indicate that the bit(s) of the dynamic field(s) is corrupt. The mixing of bits of a static field(s) and one or more bits of a dynamic field(s) in a row of the non-volatile memory array thereby implicates the bit(s) of the dynamic field(s) in an integrity check of the bits of the static field(s).

In one approach, the security circuit is configured to perform the integrity check on the bits of the static field(s) as a function of the static bits and a set of check bits. The check bits can be stored in a different row of the non-volatile memory array 102. For example, the security circuit can perform a cyclic redundancy check or cryptographic hash on the static bits and compare the result with a value represented by the check bits. The security circuit can be configured to perform different integrity checks on different groups of static bits. The value represented by the check bits can be programmed into the non-volatile memory array by a manufacturer or vendor, for example.

In response to the bits of the static field(s) failing the integrity check, the security circuit can assert the alert signal 112 to a state that indicates a security violation. The security circuit can be a hardwired state machine or a processor that executes program code. The logic of the security circuit can be integrated with a configuration and security unit of the electronic system.

Booting of the electronic system can be enabled or disabled in response to the state of the alert signal 112. For example, loading of a boot image, such as a configuration bitstream or program code, into memory circuits of the electronic system can be disabled in response to the state of the alert signal indicating a security violation. Loading of the boot image into the memory circuits can be enabled in response to the state of the alert signal not indicating a security violation. As non-limiting examples, an electronic system can be a system-on-chip (SoC), a system-in-package (SiP), a programmable logic device (PLD), a field programmable gate array (FPGA), a microprocessor, etc. The integrity check performed by the security circuit can be implemented as hardwired logic, for example.

Figure 2:
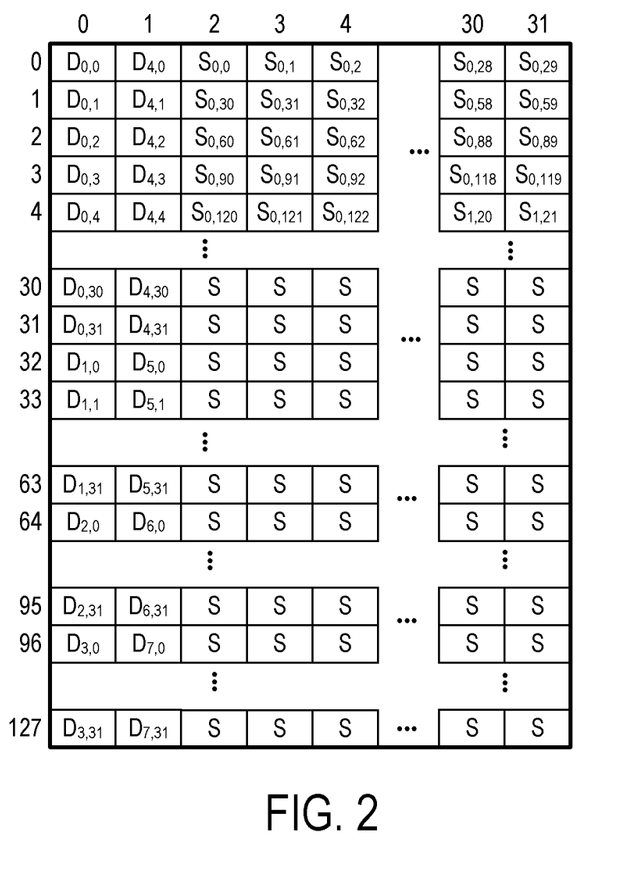
FIG. 2 shows an example in which the bits of dynamic fields are striped in columns of non-volatile storage.
Figure 3:
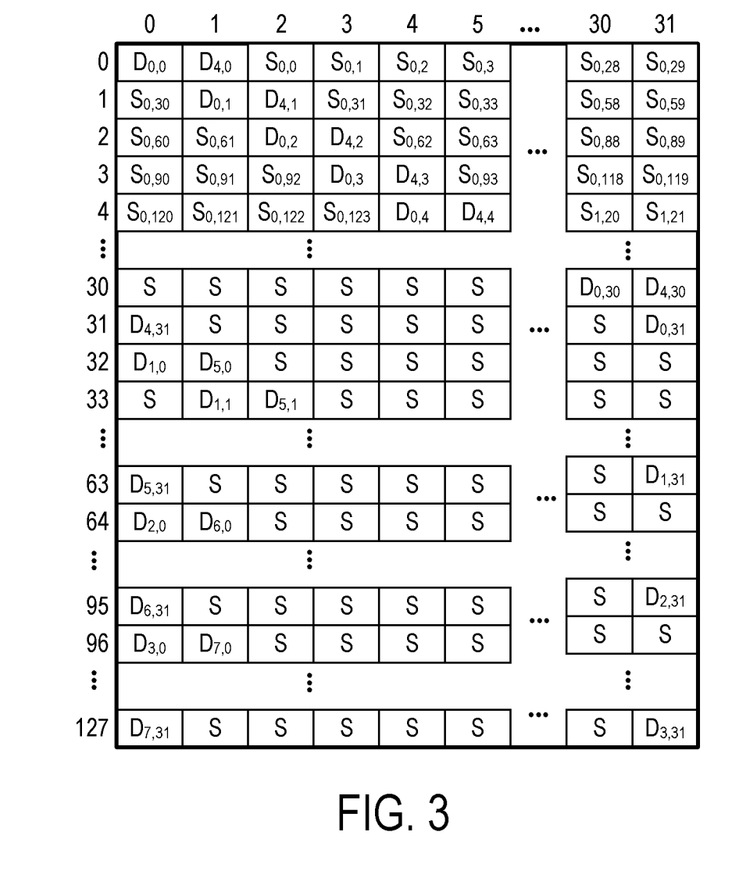
FIG. 3 shows an example in which the bits of dynamic fields are striped diagonally in rows and columns of non-volatile storage.
Figure 4:
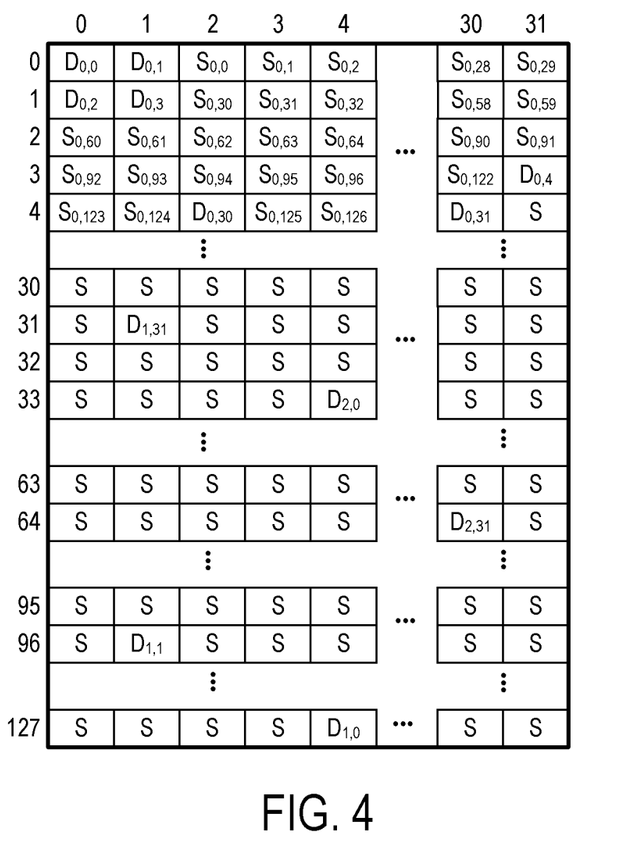
FIG. 4 shows an example in which bits of dynamic fields are in an irregular pattern in rows and columns of non-volatile storage.

FIGS. 2, 3, and 4 show different approaches by which bits of dynamic fields and bits of static fields can be mixed in rows of a non-volatile memory array. FIG. 2 shows an example in which the bits of dynamic fields are striped in columns of an array of non-volatile memory cells. The approach illustrated in FIG. 2 can be referred to as "column striping." In column striping, consecutive bits of a dynamic field are stored in different rows of the same column.

The notation in the figures references bits as belonging either to a dynamic filed ("D") or to a static field ("S"). The subscripts generally refer to the field number and bit number within that field. For example, $D_{1,31}$ refers to bit 31 of dynamic field 1, and $S_{0,92}$ can refer to bit number 92 of static field 0. It will be recognized that multiple static fields can be grouped together and one integrity check can be performed on the bits of the multiple static fields.

The example assumes a non-volatile memory array having 128 rows and 32 columns of non-volatile memory cells. The control circuit would read one row at a time from the non-volatile memory array and store the contents of that row in an addressable unit, such as a 32-bit word of a RAM. Thus, the patterns illustrated in FIGS. 2, 3, and 4 are applicable to the non-volatile memory array and can also be applicable to addressing of data in the volatile storage circuits.

The example of FIG. 2 shows 7 32-bit dynamic fields stored in columns 0 and 1, 128-bit static field 0 stored in rows 0-3 and part of row 4, and part of static field 1 stored in row 4. The bits of dynamic field 0 are stored in column 0, rows 0-31, and the bits of dynamic field 7 are stored in column 1, rows 96-127, for example. The bits of static field 0 are stored in columns 2-31, rows 0-3 and in row 4, columns 2-9.

The security circuit reads data from the number of addressable units (e.g., words) of the volatile storage circuits needed to perform an integrity check. To perform an integrity check on static field 0 in the example, the security circuit reads words 0-4 and selects the bits from columns 2-31, rows 0-3 and in row 4, columns 2-9. In selecting bits from columns 2-31, rows 0-3 and in row 4, columns 2-9 to obtain bits 0-127 of the static field, the security circuit excludes the bits 0-4 of dynamic field 0 and excludes bits 0-4 of dynamic field 4. The security circuit can then perform the integrity check on the bits of the static field independent of the bits of the dynamic fields.

FIG. 3 shows an example in which the bits of dynamic fields are striped diagonally in rows and columns of non-volatile storage. The example of FIG. 3 illustrates the same 7 32-bit dynamic fields and two static fields as FIG. 2. Bits 0-31 of dynamic field 0 are stored, respectively, in row 0/column 0, row 1/column 1, row 2/column 2, . . . , row 31/column 31. Dynamic field 1 begins in row 32/column 0 and ends in row 63/column 31. Bits 0-31 of dynamic field 4 are stored, respectively, in row 0/column 1, row 1/column 2, row 2/column 3, . . . , row 30/column 31, row 31/column 0. Bits of static field 0 are stored in consecutive columns in rows 0-4 in positions that are not occupied by bits of dynamic fields 0 or 4.

Though FIGS. 2 and 3 illustrate mixing of bits of dynamic fields and static fields in a regular pattern in the rows and columns, the bits can be mixed in an irregular pattern depending on application objectives.

FIG. 4 shows an example in which bits of dynamic fields are in an irregular pattern in rows and columns of non-volatile storage. The example of FIG. 4 shows portions of dynamic fields 0, 1, and 2 stored in various rows and columns. Bits 0 and 1 of dynamic field 0 are stored in row 0/columns 0-1, bits 2 and 3 are stored in row 1/columns 0-1, bit 4 is stored in row 3/column 31, and bits 30 and 31 are stored in row 4/columns 2 and 30. The remaining bits of dynamic field 0 are not shown but are stored in other positions of the array.

Figure 5:
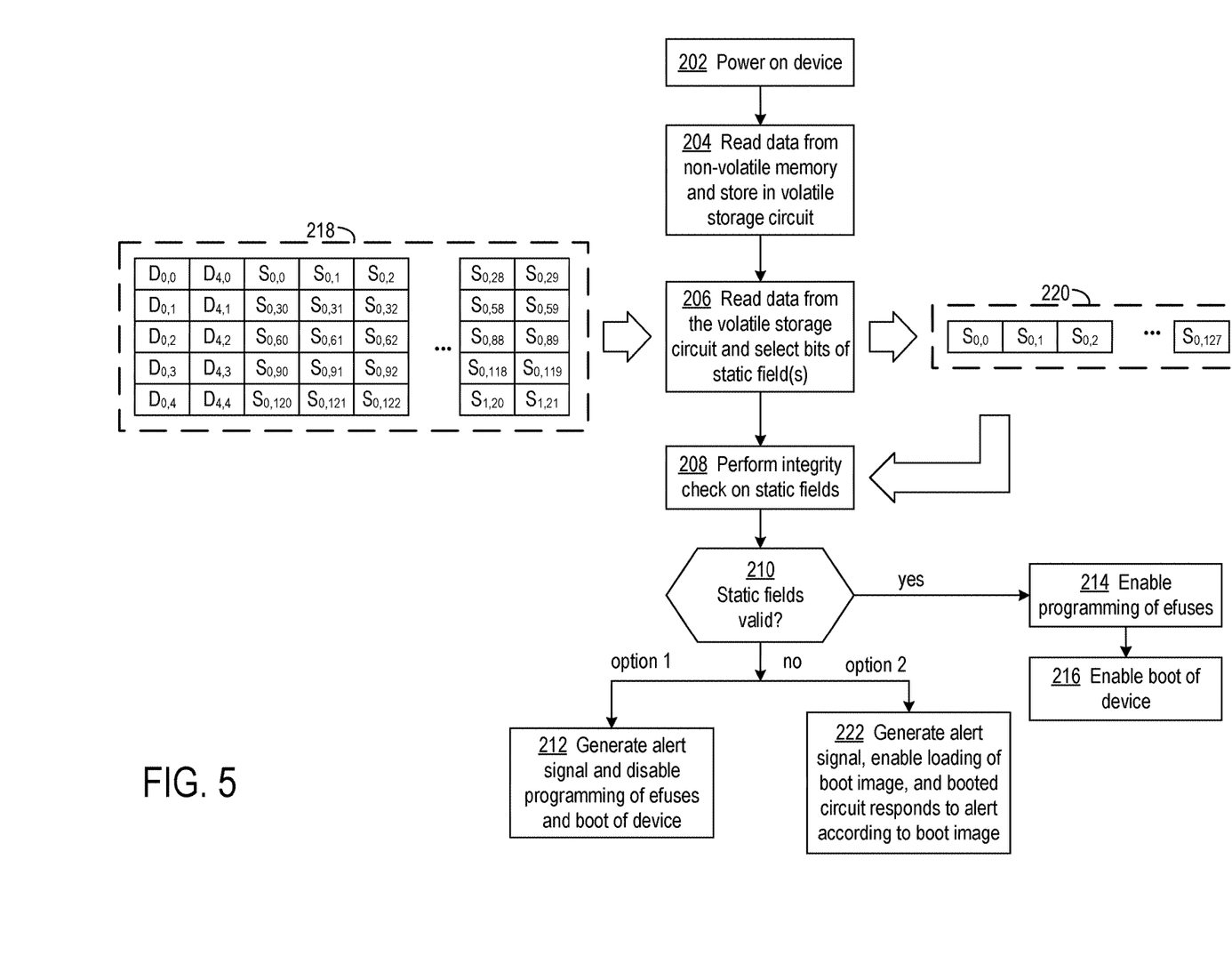
FIG. 5 shows a flowchart of an exemplary process for protecting an electronic system against EMFI attacks on non-volatile storage.

FIG. 5 shows a flowchart of an exemplary process for protecting an electronic system against EMFI attacks on non-volatile storage. At block 202, power is applied to the system. The controller circuit 104 (FIG. 1) reads data from the non-volatile memory array 102 (FIG. 1) at block 204 and stores each row of data, which contains bits of both a dynamic field(s) and a static field, in an addressable unit of volatile storage circuit 106 (FIG. 1).

At block 206, the security circuit 108 (FIG. 1) reads from the storage circuit, data that contain a static field to be verified and selects the bits of the static field(s). The data read from the volatile storage circuits can occupy one or more addressable units and will contain bits of both a dynamic field and one or more static fields. The operation of block 206 is illustrated using the example from FIG. 2 in which bits of the dynamic fields are striped in columns 0 and 1. Dashed block 218 indicates the group of addressable units read from the volatile storage circuits. The number of addressable units read contains all the bits needed to perform the integrity check on static field 0. Though not shown, it will be recognized that the security circuit could read additional data from the volatile storage circuits at block 206 in order to obtain check bits used in the integrity check. Dashed block 220 illustrates bits 0-127 of static field 0 selected for the integrity check.

At block 208, the security circuit performs an integrity check on the static field. As indicated above, the integrity check can be CRC or based on a cryptographic hash.

In response to the static field failing the integrity check, decision block 210 directs the security circuit to block 212. At block 212, the security circuit asserts an alert signal to indicate the system has been compromised. In some implementations, the asserted alert signal disables further programming of the non-volatile memory cells of the system and disables booting of the system. Alternatively, at block 222 the security circuit can assert an alert signal to indicate the system has been compromised and enable loading of the boot image into the system, and the system having booted with the boot image can respond accordingly to the asserted alert signal. For example, the system can have a programmable circuit, such as programmable logic or a microprocessor, and the boot image can configure the programmable circuit to operate in a restricted mode or an unrestricted mode in response to the state of the alert signal. In response to the state of the alert signal indicating a security violation, the booted programmable circuit can operate in a restricted mode, and in response to the state of the alert signal not indicating a security violation, the booted programmable circuit can operate in an unrestricted mode. An example of a restricted mode can be to lock the system and prevent the system from further operations.

In response to the static field being valid, decision block 210 directs the security circuit to block 214. At block 214, the security circuit de-asserts the alert signal, which can enable programming of the non-volatile memory cells and enable booting of the device at block 216. The operations of blocks 206-216 can be repeated each of the static fields to be integrity checked.

Figure 6:
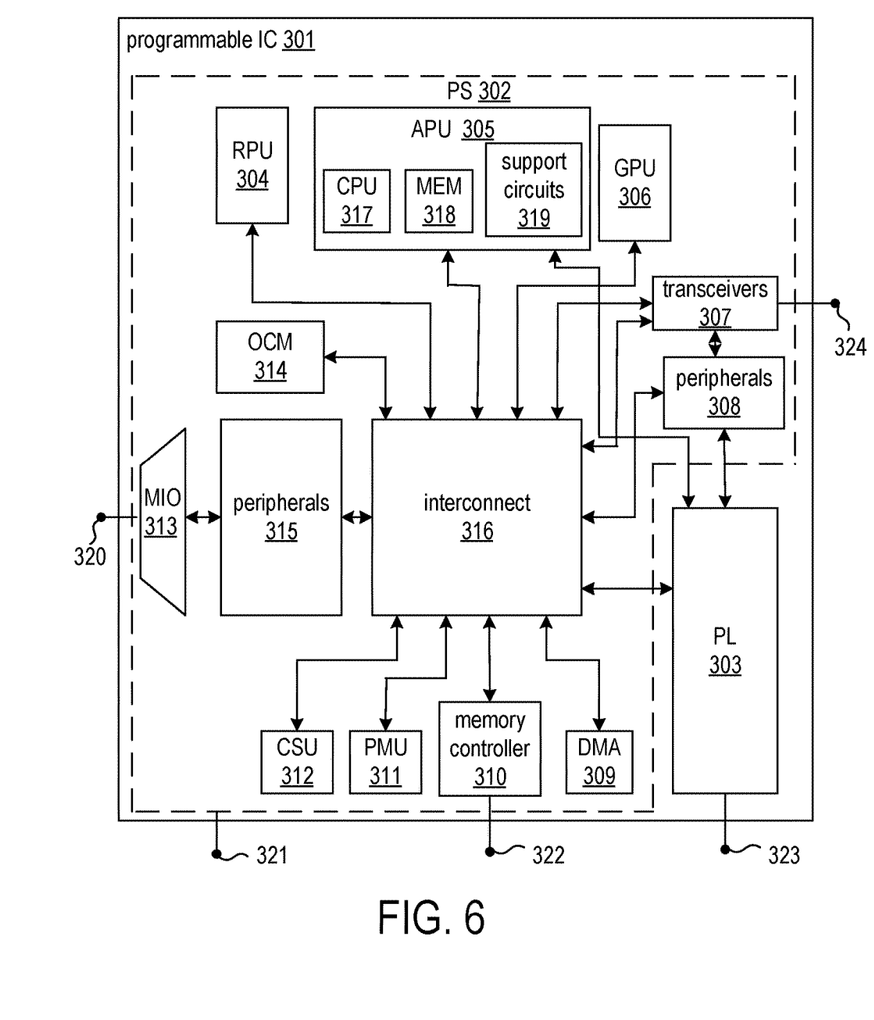
FIG. 6 is a block diagram depicting a System-on-Chip (SoC) that can implement the disclosed approaches for detecting against EMFI attacks on an electronic system.

FIG. 6 is a block diagram depicting a System-on-Chip (SoC) 301 that can implement the disclosed approaches for detecting against EMFI attacks on an electronic system. In the example, the SoC includes the processing subsystem (PS) 302 and the programmable logic subsystem 303. The processing subsystem 302 includes various processing units, such as a real-time processing unit (RPU) 304, an application processing unit (APU) 305, a graphics processing unit (GPU) 306, a configuration and security unit (CSU) 312, and a platform management unit (PMU) 311. The security circuit (FIG. 1) can be integrated with CSU 312 or be a support circuit outside the CSU. The PS 302 also includes various support circuits, such as on-chip memory (OCM) 314, transceivers 307, peripherals 308, interconnect 316, DMA circuit 309, memory controller 310, peripherals 315, and multiplexed (MIO) circuit 313. The processing units and the support circuits are interconnected by the interconnect 316. The PL subsystem 303 is also coupled to the interconnect 316. The transceivers 307 are coupled to external pins 324. The PL 303 is coupled to external pins 323. The memory controller 310 is coupled to external pins 322. The MIO 313 is coupled to external pins 320. The PS 302 is generally coupled to external pins 321. The APU 305 can include a CPU 317, memory 318, and support circuits 319. The APU 305 can include other circuitry, including L1 and L2 caches and the like. The RPU 304 can include additional circuitry, such as L1 caches and the like. The interconnect 316 can include cache-coherent interconnect or the like.

Referring to the PS 302, each of the processing units includes one or more central processing units (CPUs) and associated circuits, such as memories, interrupt controllers, direct memory access (DMA) controllers, memory management units (MMUs), floating point units (FPUs), and the like. The interconnect 316 includes various switches, busses, communication links, and the like configured to interconnect the processing units, as well as interconnect the other components in the PS 302 to the processing units.

The OCM 314 includes one or more RAM modules, which can be distributed throughout the PS 302. For example, the OCM 314 can include battery backed RAM (BBRAM), tightly coupled memory (TCM), and the like. The memory controller 310 can include a DRAM interface for accessing external DRAM. The peripherals 308, 315 can include one or more components that provide an interface to the PS 302. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, PCIe ports, and the like. The peripherals 315 can be coupled to the MIO 313. The peripherals 308 can be coupled to the transceivers 307. The transceivers 307 can include serializer/deserializer (SERDES) circuits, MGTs, and the like.

Various logic may be implemented as circuitry to carry out one or more of the operations and activities described herein and/or shown in the figures. In these contexts, a circuit or circuitry may be referred to as "logic," "module," "engine," or "block." It should be understood that logic, modules, engines and blocks are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for detecting EMFI attacks on OTP circuits. Other aspects and features will be apparent to those skilled in the art from consideration of the specification. The circuits and methods can be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
an array of non-volatile memory cells arranged in a plurality of rows and a plurality of columns;
a volatile storage circuit configured to provide addressable units of storage; and
a control circuit coupled to the array of non-volatile memory cells and to the volatile storage circuit, wherein the control circuit is configured to read first type data and second type data from one or more rows of the plurality of rows and the plurality of columns of the array of non-volatile memory cells, and store the first type data and second type read from each row in one or more addressable units of storage of the volatile storage circuit; and
a security circuit coupled to the volatile storage circuit, the security circuit configured to:
read first data from the one or more of the addressable units of the volatile storage circuit,
select from the first data, the second type data that includes one or more bits of each of the one or more of the addressable units,
perform an integrity check on the second type data selected from the first data, and
generate an alert signal that indicates a security violation in response to failure of the integrity check.

2. The circuit arrangement of claim 1, wherein the integrity check on the second type data is independent of states of the first type data.

3. The circuit arrangement of claim 2, wherein the security circuit is further configured to:
read second data from two or more of the addressable units of the volatile storage circuit;
select from the second data a plurality of check bits; and
perform the integrity check on the second type data as a function of the second type data and the check bits.

4. The circuit arrangement of claim 3, wherein the security circuit is configured to perform a cyclic redundancy check on the second type data with reference to the check bits.

5. The circuit arrangement of claim 3, wherein the security circuit is configured to perform a cryptographic hash on the second type data with reference to the check bits.

6. The circuit arrangement of claim 1, wherein the second type data specify a serial number.

7. The circuit arrangement of claim 1, wherein the second type data specify a cryptographic key.

8. The circuit arrangement of claim 1, wherein the first type data indicate one of validity or invalidity of the second type data.

9. The circuit arrangement of claim 1, wherein the security circuit 108 is configured to:
disable loading of a boot image in response to the alert signal indicating a security violation; and
enable loading of the boot image in response to the alert signal not indicating a security violation.

10. The circuit arrangement of claim 1, further comprising a programmable circuit that is programmable to perform operations specified in a boot image, wherein:
the security circuit is configured to enable loading of the boot image in response to the alert signal indicating a security violation; and
the programmable circuit is configured to:
operate in a restricted mode programmed by the boot image in response to the alert signal indicating a security violation, and
operate in an unrestricted mode programmed by the boot image in response to the alert signal not indicating a security violation.

11. The circuit arrangement of claim 1, wherein the volatile storage circuit has rows and columns of memory cells, and the security circuit is configured to exclude from the second type data selected from the first data, the first type data stored as a stripe in one or more of the columns of the volatile storage circuit.

12. The circuit arrangement of claim 1, wherein the volatile storage circuit has rows and columns of memory cells, and the security circuit is configured to exclude from the second type data selected from the first data, the first type data stored as a stripe diagonally in the columns and rows of the volatile storage circuit.

13. The circuit arrangement of claim 1, wherein the non-volatile memory cells are one-time programmable circuits.

14. The circuit arrangement of claim 1, wherein the one-time programmable circuits are efuse cells.

15. A method comprising:
reading by a control circuit, first type data and second type data from one or more rows of a plurality of rows and a plurality of columns of an array of non-volatile memory cells;
storing the first type data and second type read from each row in one or more addressable units of storage of a volatile storage circuit configured to provide addressable units of storage;
reading by a security circuit, first data from the one or more of the addressable units of the volatile storage circuit;
selecting from the first data by the security circuit, the second type data that includes one or more bits of each of the one or more of the addressable units;
performing an integrity check on the second type data selected from the first data by the security circuit; and
generating an alert signal that indicates a security violation in response to failure of the integrity check.

16. The method of claim 15, wherein the integrity check on the second type data is independent of states of the first type data.

17. The method of claim 16, further comprising:
reading second data from two or more of the addressable units of the volatile storage circuit by the security circuit;
selecting from the second data a plurality of check bits by the security circuit; and
performing the integrity check on the second type data as a function of the second type data and the check bits by the security circuit.

18. The method of claim 17, wherein the performing the integrity check includes performing a cyclic redundancy check on the second type data with reference to the check bits.

19. The method of claim 17, wherein the performing the integrity check includes performing a cryptographic hash on the second type data with reference to the check bits.

20. The method of claim 15, wherein the volatile storage circuit has rows and columns of memory cells, and the method further comprising excluding by the security circuit, is configured to exclude from the second type data selected from the first data, the first type data stored as a stripe in one or more of the columns of the volatile storage circuit.

* * * * *